United States Patent [19]
Fletcher et al.

[11] Patent Number: 5,533,697
[45] Date of Patent: Jul. 9, 1996

[54] MOUSE PAD WITH BEVERAGE HOLDER

[75] Inventors: James R. Fletcher, 3330 Vagabond La., Plymouth, Minn. 55447; Mark A. Krull, 7932 Somerset Rd., Woodbury, Minn. 55125

[73] Assignees: Mark A. Krull, Northfield, Minn.; James R. Fletcher, Richmond, Va.

[21] Appl. No.: 336,499

[22] Filed: Nov. 9, 1994

[51] Int. Cl.⁶ ............................................. A47B 91/00
[52] U.S. Cl. ................ 248/146; 248/918; 248/346.03; 248/311.2; D14/114
[58] Field of Search ........................ 248/146, 346, 248/118, 118.1, 118.3, 118.5, 311.2, 918

[56] References Cited

U.S. PATENT DOCUMENTS

| | | | |
|---|---|---|---|
| D. 309,450 | 7/1990 | Hassel et al. | D14/114 |
| D. 350,947 | 9/1994 | Klinger et al. | D14/114 |
| D. 361,556 | 8/1995 | Moro et al. | D14/114 |
| 3,817,190 | 6/1974 | Evangelista | 108/44 |
| 5,074,511 | 12/1991 | Wilson | 248/346 |
| 5,197,699 | 3/1993 | Smith et al. | 248/118 |
| 5,273,182 | 12/1993 | Laybourne | 220/740 |
| 5,340,075 | 8/1994 | Schriner | 248/346 |
| 5,355,811 | 10/1994 | Brewer | 108/43 |
| 5,398,895 | 3/1995 | Whetherhult et al. | 248/51 |

*Primary Examiner*—Karen J. Chotkowski
*Assistant Examiner*—Anita M. King

[57] ABSTRACT

The present invention provides a mouse pad with a hole formed through the mouse pad to selectively retain a beverage container proximate the mouse pad. An insert may be inserted into the hole to function as a coaster for the beverage container.

25 Claims, 11 Drawing Sheets

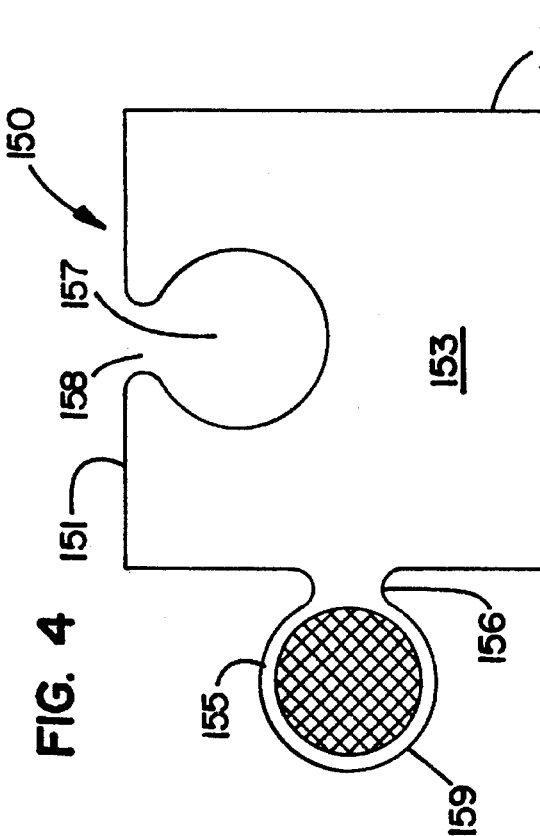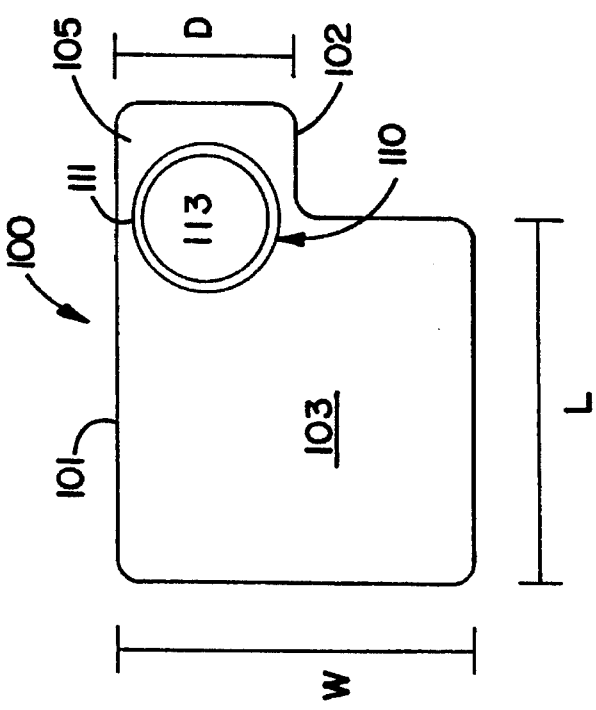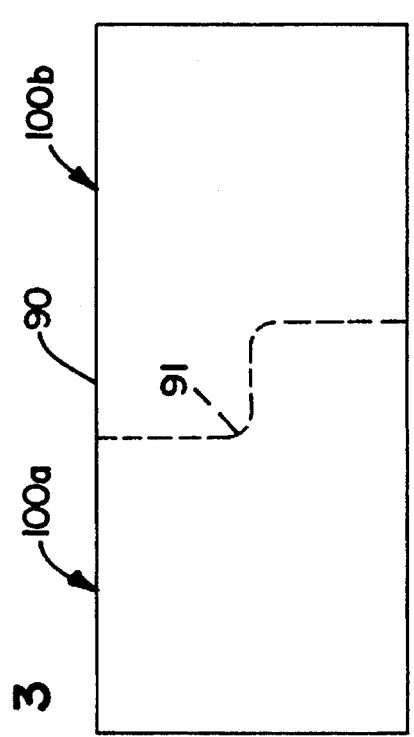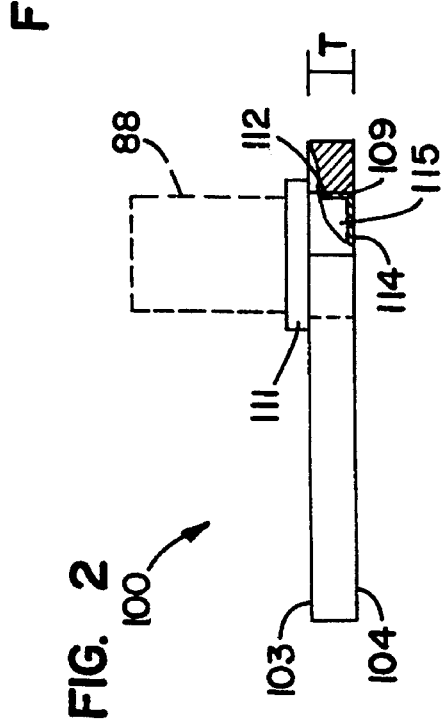

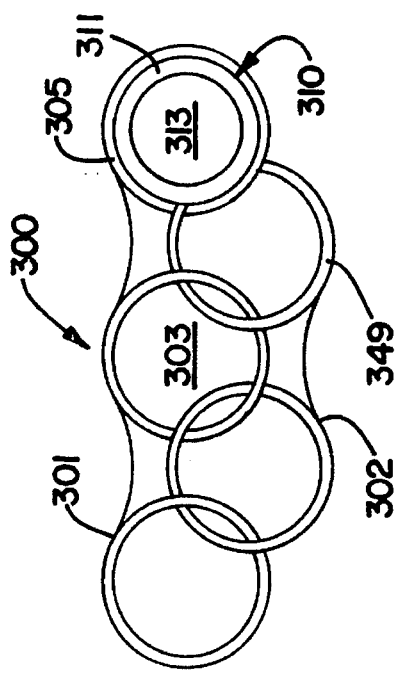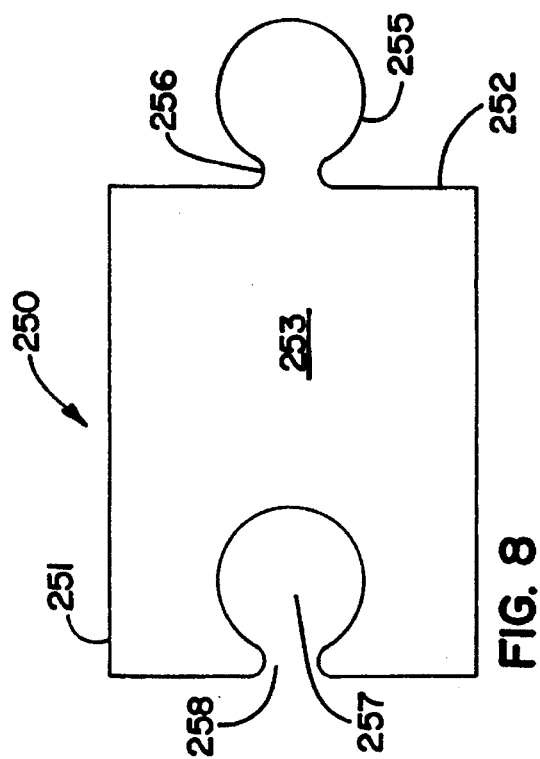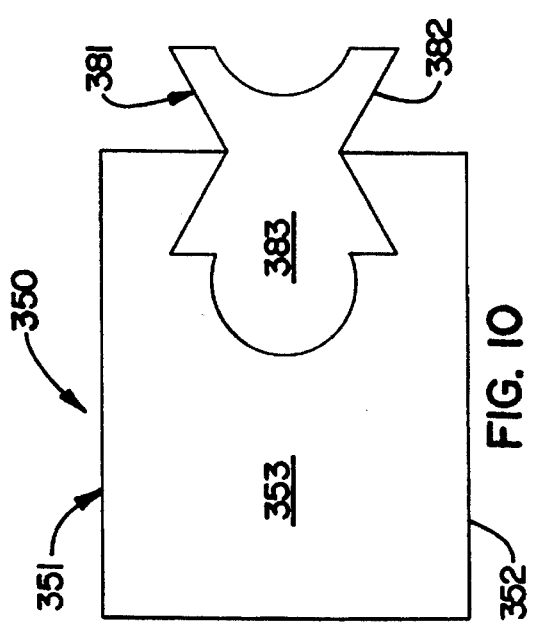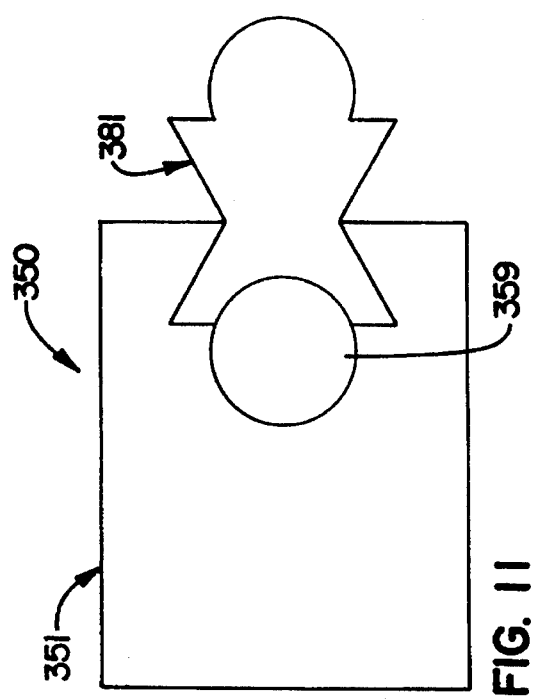

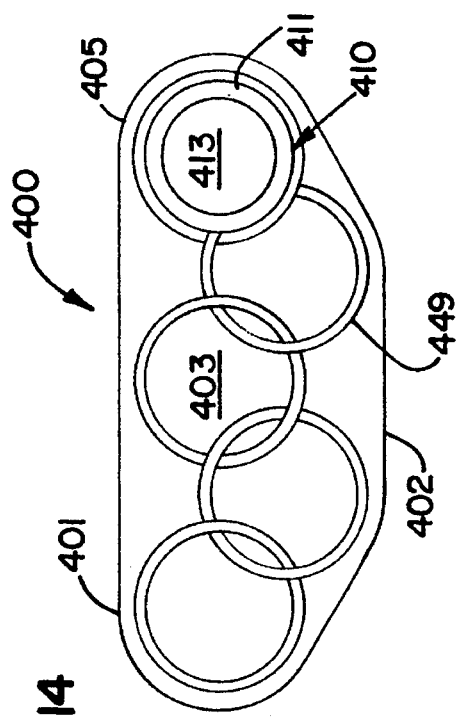
FIG. 14
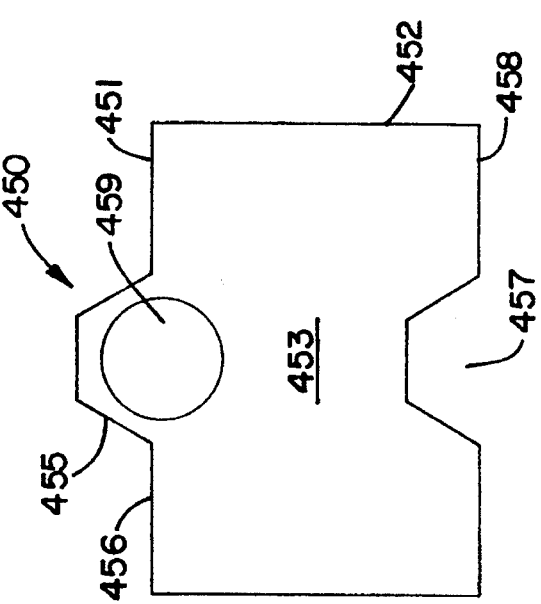
FIG. 15
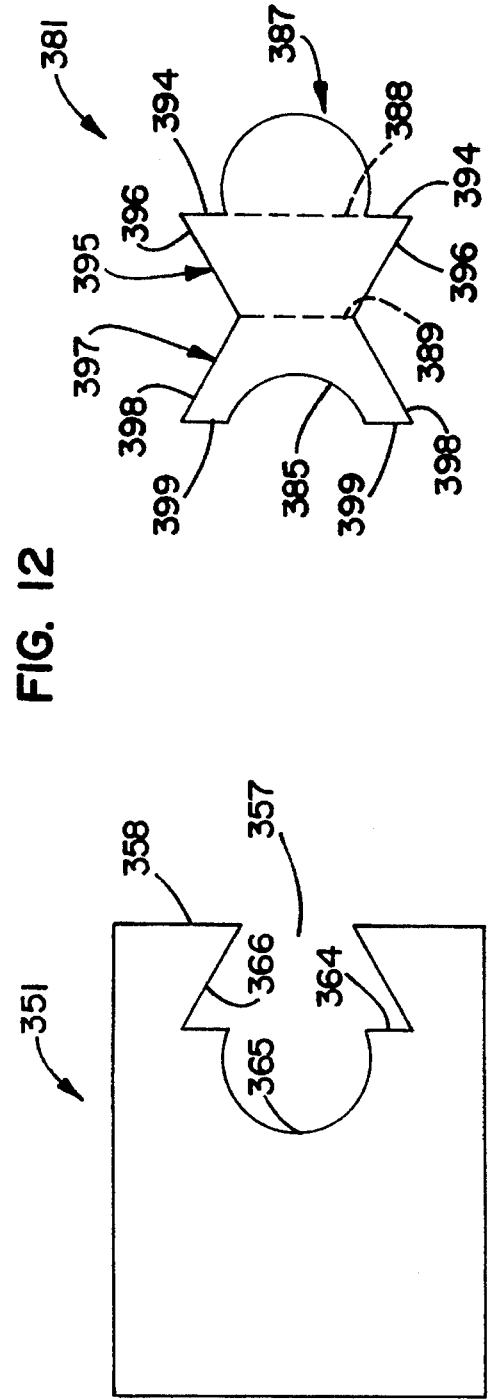
FIG. 12
FIG. 13

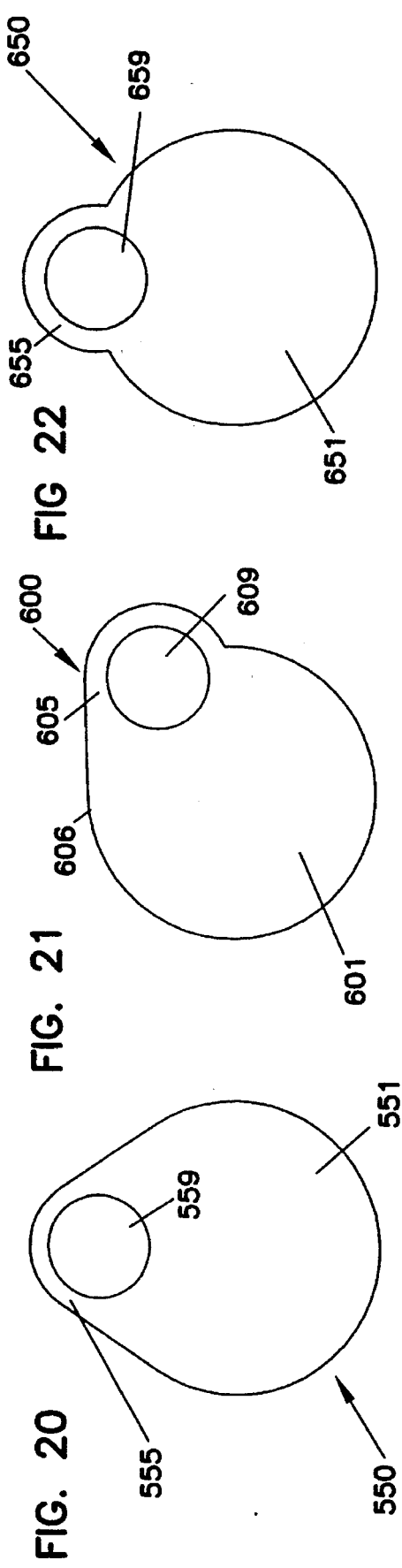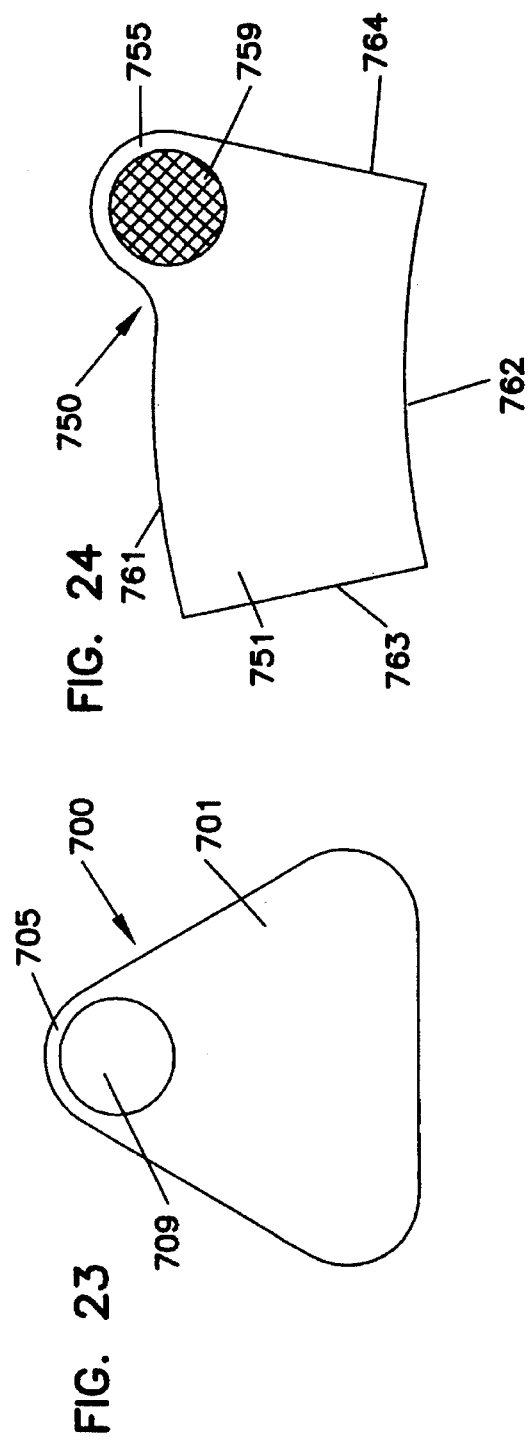

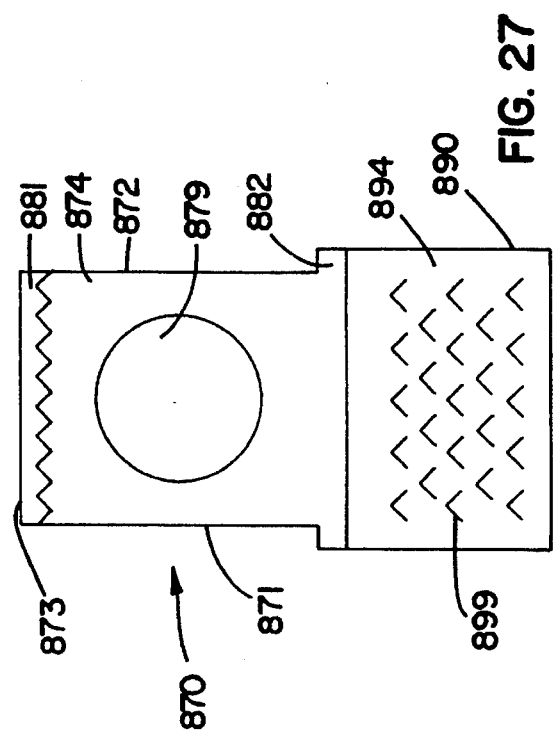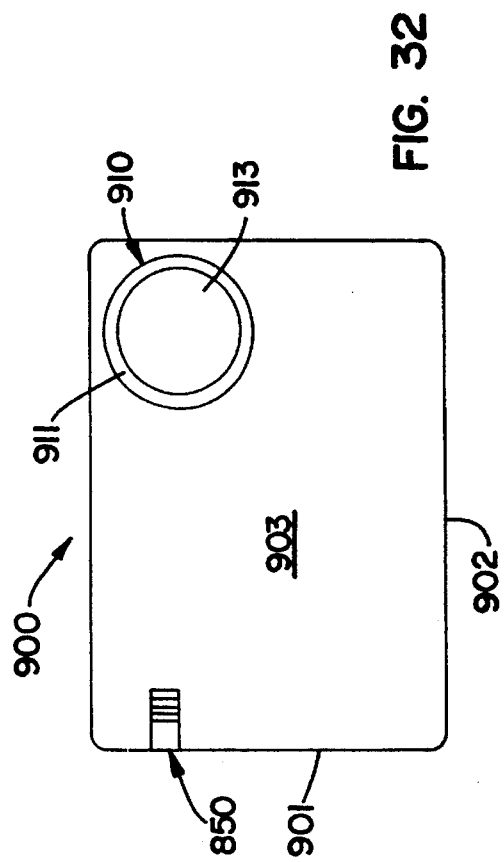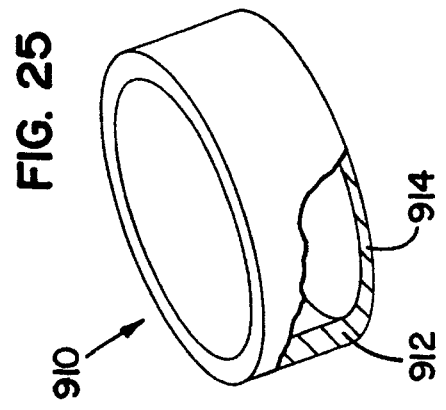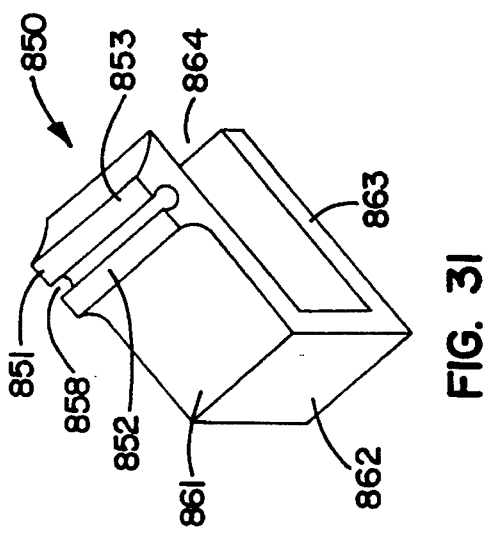

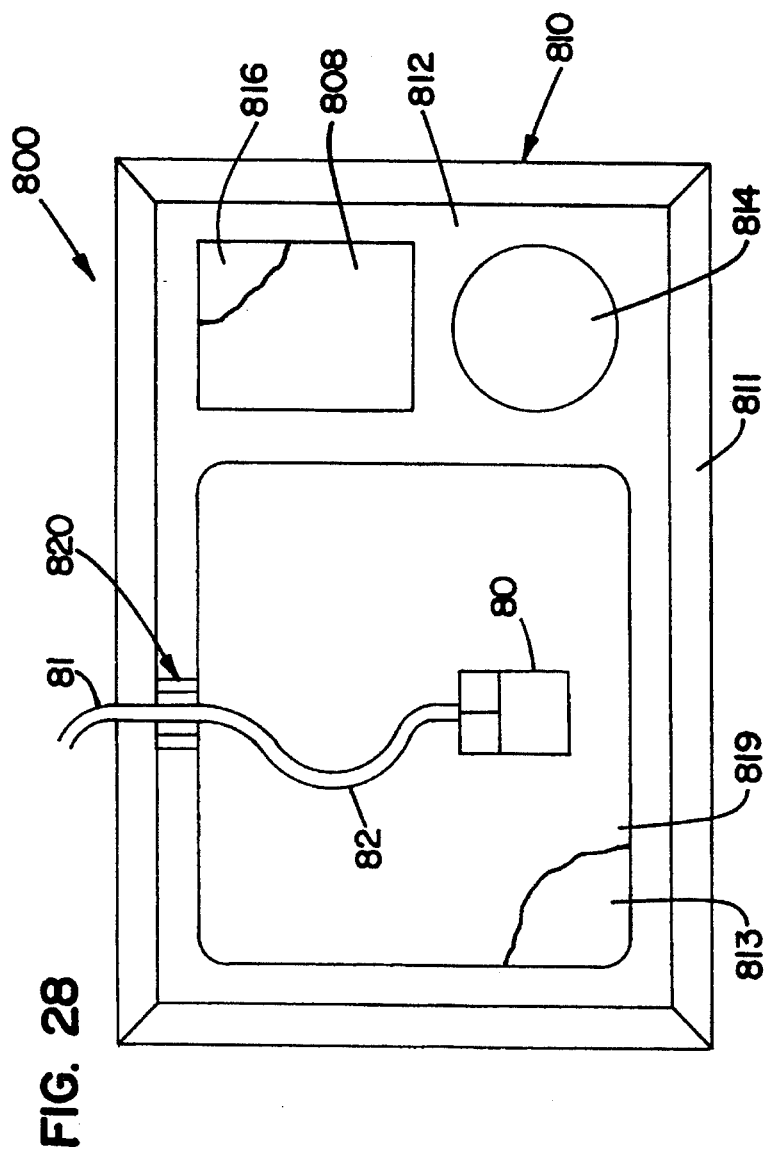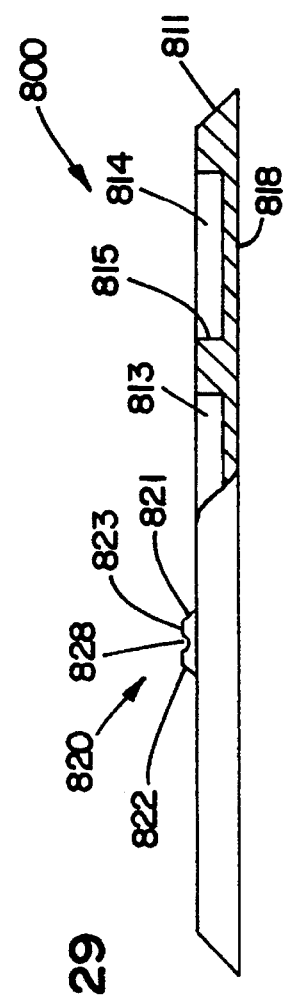

MOUSE PAD WITH BEVERAGE HOLDER

FIELD OF THE INVENTION

The present invention relates to desktop accessories and in particular, to mouse pads and beverage holders.

BACKGROUND OF THE INVENTION

The amount of desk space within arm's reach of a seated person is significantly limited, and for convenience, people typically want to place as many objects possible in this relatively small space directly in front of them. For many people, the single largest space consuming item is a computer and associated peripheral devices, which typically include a monitor, a keyboard, and a mouse pad, in addition to the housing for the computer itself. Material to be entered into the computer is typically placed to one side of the keyboard, and the mouse pad is typically placed to the opposite side of the keyboard. For a person seated in a chair in front of the computer arrangement described above, the only remaining desk space immediately within reach is often limited to six inches or so beyond the material to be entered and six inches or so around two sides of the mouse pad.

Most people tend to drink a beverage while working for any extended period of time at their desk, so a beverage container, such as a coffee mug or pop can is often another of the objects placed within arm's reach. Most people also tend to use the same hand for drinking that they use in operating the computer mouse. Also, most people see the wisdom of keeping their beverage a safe distance from the material to be entered into the computer. Accordingly, a significant number of people keep their beverage container near their mouse pad. People are also conditioned not to place a beverage container directly on a table top or desktop simply to avoid the risk of leaving water marks on the desktop. Thus, regardless of the amount of desk space available, many people keep their beverage container directly on top of their mouse pad.

One problem or potential problem with the behavior or tendencies discussed above is that a conventional mouse pad is neither specifically designed nor ideally suited for supporting a beverage container. For example, water can condense on the outside of the beverage container, run down onto the mouse pad, and damage the mouse or otherwise hinder its operation. Another problem or potential problem is that operation of the mouse can result in accidental disruption of the contents of the beverage container and spillage of the beverage. Thus, a need exists for reliable storage of a beverage container on or near a mouse pad. Ideally, a solution to these problems should be inexpensive to implement and effective in use.

The cord that connects the mouse to the computer not only creates a risk of disrupting the contents of a beverage container, but also can hinder operation of the mouse. For example, during operation of a mouse, the cord sometimes becomes caught on other objects on or near the desktop, including loops of the cord itself, beverage containers, and the edges of the mouse pad. The mouse cord also places undesirable drag on the mouse when, for example, the cord hangs over an edge of the desktop. Thus, there also exists a need for preventing the mouse cord from interfering with efficient operation of the mouse and/or from increasing the likelihood of accidents as a result of such operation.

SUMMARY OF THE INVENTION

The present invention provides various structures for reliably storing a beverage container on or near a mouse pad. In one embodiment, a designated surface on the top of a mouse pad is provided to support a beverage container thereon. The location of the designated surface is remote relative to the general work surface of the mouse pad and thus, minimizes the likelihood of interfering with operation of the mouse and/or accidental spillage.

In another embodiment, a circular hole, sufficient in size to accommodate the cross-section of a beverage container, is formed through the mouse pad. In a preferred embodiment, the circular hole is sufficient in size to accommodate a cup-like coaster, which in turn, is sufficient in size to accommodate the beverage container. The depth of the hole and/or the coaster enhances the stability of the beverage container against tipping and captures condensation that may collect on the beverage container. Also, the preferred embodiment can be manufactured with no significant changes to currently known and practiced methods for making mouse pads.

Yet another embodiment provides a desktop organizer having separate compartments for retaining a mouse pad and a beverage container. The desktop organizer also provides a mouse cord clip for anchoring the mouse cord relative thereto and thereby isolating a distal portion of the cord. Many of the advantages of the present invention will become apparent upon a more detailed description of the present invention.

BRIEF DESCRIPTION OF THE DRAWING

With reference to the Figures, wherein like numerals represent like parts and assemblies throughout the several views, FIG. 1 is a top or plan view of a preferred embodiment mouse pad constructed according to the principles of the present invention;

FIG. 2 is a partially sectioned side view of the preferred embodiment mouse pad shown in FIG. 1;

FIG. 3 is a top or plan view of a sheet of mouse pad material from which may be cut two of the preferred embodiment mouse pads shown in FIG. 1;

FIG. 4 is a top or plan view of an alternative embodiment mouse pad constructed according to the principles of the present invention;

FIG. 8 is a top or plan view of another alternative embodiment mouse pad constructed according to the principles of the present invention;

FIG. 9 is a top or plan view of another alternative embodiment mouse pad constructed according to the principles of the present invention;

FIG. 10 is a top or plan view of another alternative embodiment mouse pad constructed according to the principles of the present invention, depicted in a first configuration;

FIG. 11 is a top or plan view of the alternative embodiment mouse pad shown in FIG. 10, depicted in a second configuration;

FIG. 12 is a top or plan view of one of the components of the alternative embodiment mouse pad shown in FIGS. 10 and 11;

FIG. 13 is a top or plan view of another of the components of the alternative embodiment mouse pad shown in FIGS. 10 and 11;

FIG. 14 is a top or plan view of another alternative embodiment mouse pad constructed according to the principles of the present invention;

FIG. 15 is a top or plan view of another alternative embodiment mouse pad constructed according to the principles of the present invention;

FIG. 20 is a top or plan view of another alternative embodiment mouse pad constructed according to the principles of the present invention;

FIG. 21 is a top or plan view of another alternative embodiment mouse pad constructed according to the principles of the present invention;

FIG. 22 is a top or plan view of another alternative embodiment mouse pad constructed according to the principles of the present invention;

FIG. 23 is a top or plan view of another alternative embodiment mouse pad constructed according to the principles of the present invention;

FIG. 24 is a top or plan view of another alternative embodiment mouse pad constructed according to the principles of the present invention;

FIG. 25 is a perspective view of an alternative insert for selective use with any of the mouse pads shown in FIGS. 1–24;

FIG. 27 is a top or plan view of another mouse pad appendage constructed according to the principles of the present invention;

FIG. 28 is a top or plan view of a desktop organizer constructed according to the principles of the present invention;

FIG. 29 is a partially sectioned side view of the desktop organizer shown in FIG. 28;

FIG. 31 is a perspective view of a mouse cord clip constructed according to the principles of the present invention;

FIG. 32 is a top or plan view of another mouse pad constructed according to the principles of the present invention, with the clip shown in FIG. 31 secured thereto;

DETAILED DESCRIPTION OF A PREFERRED EMBODIMENT

Figure 5:
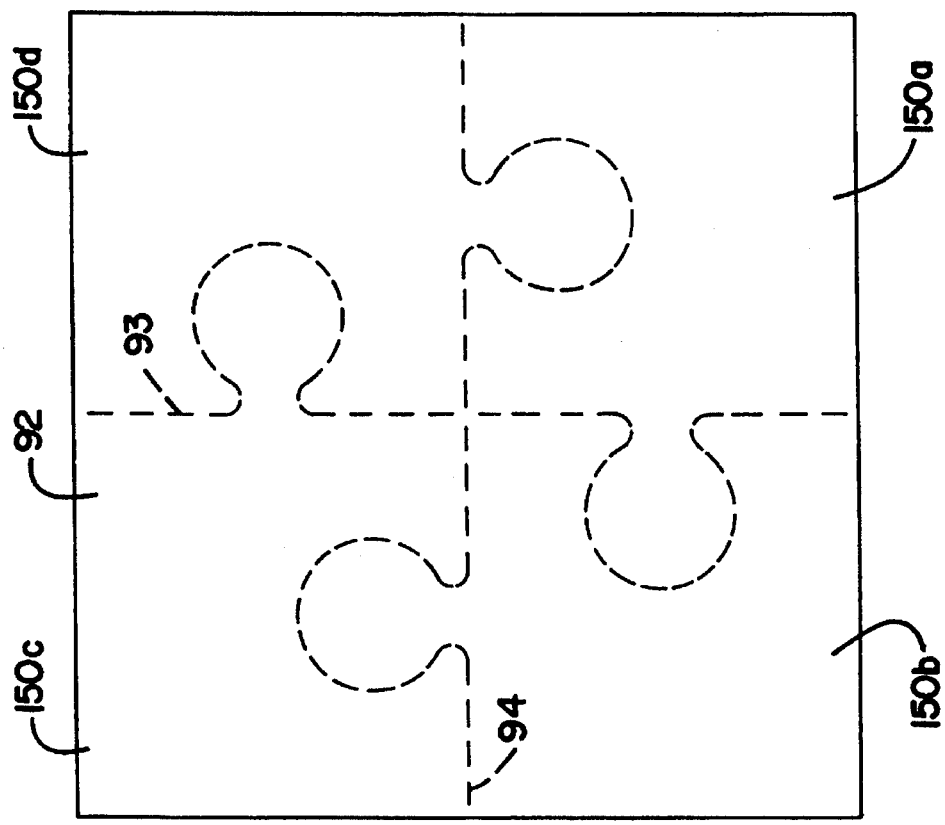
FIG. 5 is a top or plan view of a sheet of mouse pad material from which may be cut four of the alternative embodiment mouse pads shown in FIG. 4.

A preferred embodiment mouse pad constructed according to the principles of the present invention is designated as 100 in FIGS. 1 and 2. The mouse pad 100 includes a substantially planar sheet 101 of foam material having a periphery or circuitous sidewall 102 that in a very general sense may be said to be L-shaped. Methods of manufacturing the mouse pad 100 are known in the art and thus, need not be discussed herein.

The sheet 101 has an upper surface 103 and a lower surface 104 which define a substantially uniform thickness T of approximately five-eighths of an inch therebetween. The lower surface 104 generally rests on a desk top or other support surface, and the upper surface 103 supports a mouse. In the preferred embodiment, a coating of material having a relatively high coefficient of friction is disposed on the lower surface 104, and a coating of material having a relatively low coefficient of friction is disposed on the upper surface 103. The sheet 101 is generally square but includes an asymmetrical projection or extension 105 outward from one corner and along one side of the otherwise square sheet 101. The sheet 101 has a mean length L of approximately eight inches and a mean width W of approximately eight inches. The extension 105 extends longitudinally beyond the mean length L and has at least one dimension D greater than three and one-half inches. In the preferred embodiment, the extension 105 has a projection width D of four inches, or one-half of the mean width W of the sheet 101.

A circular hole 109 is formed through the sheet 101, including at least a portion of the extension 105. The hole 109 has a diameter of approximately three and one-half inches. A cup-like insert 110 nests snugly within the hole 109. The insert 110 includes an upper ring 111 having an outer diameter greater than the diameter of the hole 109, and a sidewall 112 having an outer diameter approximately equal to the diameter of the hole 109. The inner diameters of the sidewall 112 and upper ring 111 are approximately three and one-quarter inches and thus, are appropriately sized to accommodate a conventional coffee mug, as well as a conventional twelve ounce beverage can. The insert 110 further includes a bottom 114 that cooperates with the sidewall to define a cavity or containment space 115.

The mouse pad 100 is shown in an orientation suitable for storing a beverage container proximate the upper right-hand corner of the pad 100. However, the pad 100 can simply be rotated to provide other beverage location options according to personal preferences. For example, a left-handed person may find it useful to rotate the pad 100 counterclockwise 90 degrees to place the beverage container proximate the upper left-hand corner of the pad 100. Also, those skilled in the art will recognize that different mouse pad configurations can be provided to accommodate other preferences without departing from the scope of the present invention. One of the advantages of the preferred embodiment pad 100 is that it is configured to store a beverage container in a remote location relative to the general work surface on the pad regardless of whether the mouse is to operated by a person's right hand or left hand.

In the preferred embodiment, the insert 110 is a single, integral piece of plastic formed by injection molding. The depth of the cavity 115 is approximately equal to the thickness of the mouse pad 100. The insert 110 is pressed into the hole 109 and retained therein by friction fit between the sidewall 112 of the insert 110 and the cylindrical walls about the hole 109. The bottom 114 comes substantially into alignment with the lower surface 104 of the mouse pad 100 as the upper ring 111 comes into contact with the upper surface 103. A beverage container 88, such as a coffee mug or pop can, may be placed in the cavity 115 and on an upwardly facing surface 113 of the bottom 114.

The insert 110 provides a single, designated location for a person's beverage container and a more stable beverage holder than does a mere desktop or other flat surface. The insert 110 also effectively retains any liquid that may run down the beverage container, particularly where the upwardly facing wall on the ring 111 slopes inward and downward toward the center of the cavity 115. While providing a reliable beverage holder, the insert 110 is positioned so as to not significantly interfere with operation of the mouse. The insert 110 also facilitates manufacture of the invention for private label purposes, since a common mouse pad can be "customized" simply by inserting a private label or logo into the hole formed in the mouse pad.

An alternative embodiment cup or insert is designated as 910 in FIG. 25. Like the preferred embodiment insert 110, the cup 910 has a cylindrical sidewall 912 and a circular bottom 914 integrally joined to the cylindrical sidewall 912. The outer diameter of the sidewall 912 is approximately three and one-half inches, and the inner diameter is approximately three and one-quarter inches. The depth of the cup 910 is equal to that of the mouse pad 100. An advantage of this alternative embodiment is that when the cup 910 is inserted upside down into the hole 109, a lower surface on the bottom 914 lies substantially flush with the upper surface 103 of the mouse pad 100. Thus, when the beverage retaining aspect of the mouse pad 100 is not needed, the inverted cup 910 functions to provide a substantially continuous work surface for operation of the mouse and/or negates the appearance or impression that something is missing (where the hole would otherwise be).

Those skilled in the art will recognize that the cup 910 need not be inserted into a hole in a mouse pad in order to practice the present invention. For example, the cup 910 or any functionally similar coaster-like structure could simply be secured to the upper surface 103 of the mouse pad 100. This type of embodiment is shown in FIG. 31 and discussed in further detail below.

A sheet 90 of mouse pad material is shown in FIG. 3. Two preferred embodiment mouse pads 100a and 100b may be cut from the sheet 90 by cutting along the designated line 91. Since the two mouse pads 100a and 100b have complementary L-shapes, a single cut finishes an edge of each mouse pad, and waste of extraneous mouse pad material is minimal. In this regard, the present invention provides a method of cutting mouse pads having asymmetrical, yet complementary shapes.

An alternative embodiment mouse pad, having a shape similar to a corner piece in a jigsaw puzzle, is designated as 150 in FIG. 4. The mouse pad 150 includes a main sheet or base 151 having a periphery or circuitous sidewall 152. The sheet 151 has an upper surface 153 and a lower surface which define a substantially uniform thickness therebetween. The sheet 151 is generally square but includes a projection 155 and a notch 157, which have identical shapes and are disposed on adjacent sides of the sheet 151, ninety degrees out of alignment relative to one another. The projection 155 is generally circular and has a relatively narrow neck 156 that extends between the generally circular portion of the projection 155 and the generally square remainder of the sheet 151. Likewise, the notch 157 is generally circular and has a narrow throat 158 proximate the side of the generally square remainder of the sheet 101 in which the notch 152 is formed.

The relatively narrow neck 156 between the generally circular portion of the projection 155 and the remainder of the sheet 151 renders the projection 155 essentially useless for mouse operation. As a result, the projection 155 provides a convenient, dedicated platform for supporting a beverage container, such as a coffee mug or a can of pop, and the projection 155 is sized and configured for just such a purpose. In this embodiment, a circular cork pad 159 is secured to the circular portion of the projection 155 to provide a high friction, water absorbent surface for supporting the beverage container. The notch 157 is similarly useless for mouse operation yet suitable for holding a beverage. A beverage container can simply be inserted into the notch 157, or an insert like the ones discussed above with reference to the preferred embodiment, L-shaped mouse pad 100, can first be inserted into the notch 157, and then the beverage container can be placed within the insert.

A sheet 92 of mouse pad material is shown in FIG. 5. Four mouse pads 150a–150d may be cut from the sheet 92 by cutting along the designated lines 93 and 94. Since the four mouse pads 150a–d have complementary shapes, a single cut finishes an edge of each mouse pad, and waste of extraneous mouse pad material is minimal.

Figure 7:
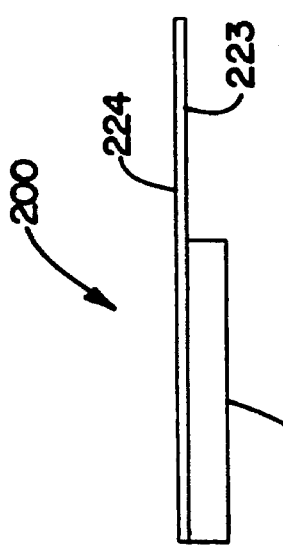
FIG. 7 is a side view of the mouse pad appendage shown in FIG. 6.
Figure 6:
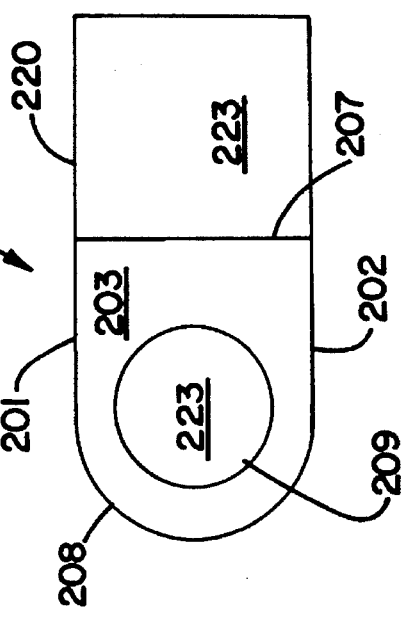
FIG. 6 is a top or plan view of a mouse pad appendage constructed according to the principles of the present invention.

A mouse pad appendage constructed according to the principles of the present invention is designated as 200 in FIGS. 6 and 7. The appendage 200 includes a block 201 of mouse pad material having a periphery or circuitous sidewall 202. The block 201 has an upper surface 203 and a lower surface which define a substantially uniform thickness therebetween, approximately equal to the thickness of a conventional mouse pad to which the appendage 200 is to be appended. The block 201 may be described as tombstone shaped, having one square end or edge 207 and one rounded end 208 with parallel sides extending linearly therebetween. A circular hole 209 is formed through the block 201 to receive and retain a beverage container and/or an insert such as the one described with reference to the preferred embodiment 100. In a preferred configuration, the hole 209 is concentric relative to the curvature of the rounded end 208.

A flap 220 is connected to the lower surface of the block 201 and extends outward beyond the square end 207 thereof. The flap 220 is made of a thin sheet of durable material, such as vinyl. In the preferred configuration, the flap 220 extends beneath the entire planform of the appendage 200 and thus, captures any condensation the runs down a beverage container stored in the hole 209. The flap 220 is designed to lie beneath a mouse pad and maintain the square end 207 of the appendage 200 in abutment with a substantially straight edge on the mouse pad. An upper surface 223 on the flap 220 lies directly beneath and in contact with a lower surface on the mouse pad, and a lower surface 224 on the flap 220 lies directly above and on the same support surface on which the mouse pad lies. An adhesive may be applied to the upper surface 223 to more positively interconnect the appendage 200 to the mouse pad. The appendage 200 facilitates incorporation of the present invention onto existing mouse pads in a cost effective and aesthetically pleasing manner. The appendage 200 also allows a person to choose where to position the beverage holder relative to the main body of the mouse pad.

Another embodiment of the present invention is designated as 250 in FIG. 8. The mouse pad 250 is similar in many respects to the one shown and discussed with reference to FIGS. 4 and 5, including some resemblance to a puzzle piece. The mouse pad 250 includes a main sheet or base 251 having a periphery or circuitous sidewall 252. The sheet 251 has an upper surface 253 and a lower surface which define a substantially uniform thickness therebetween. The sheet 251 is generally rectangular but includes a projection 255 and a notch 257, which have identical shapes and are disposed on opposite sides of the sheet 251, in alignment relative to one another. The projection 255 is generally circular and has a relatively narrow neck 256 that extends between the circular portion of the projection 255 and the generally rectangular remainder of the sheet 251. Likewise, the notch 257 is generally circular and has a narrow throat 258 proximate the side of the generally rectangular remainder of the sheet 201 in which the notch 257 is formed.

The relatively narrow neck 256 between the circular portion of the projection 255 and the remainder of the sheet 251 renders the projection 255 essentially useless for mouse operation. As a result, the projection 255 provides a convenient platform for supporting a beverage container, such as a coffee mug or a can of pop, and the projection 255 is sized and configured for just such a purpose. Additionally, the notch 257 is similarly useless for mouse operation yet suitable for holding a beverage container. A beverage container can simply be inserted into the notch 257, or an insert like the ones discussed above with reference to the preferred embodiment 100, can first be inserted into the notch 257, and then the beverage container can be placed within the insert. A plurality of this type of mouse pad can likewise be arranged in complementary fashion and cut from a sheet of mouse pad material in a manner that minimizes waste of such material.

The mouse pad 250 is symmetrical about an axis extending through the notch 257 and the projection 255 and parallel to and equal distance from opposite edges of the sidewall 252. Thus, the mouse pad 250 can simply be rotated 180 degrees to accommodate persons who like this particular configuration but prefer having the notch 257 on the right side of the pad 250. In other words, the same configuration is available from both a right-hand and a left-hand perspective.

Another embodiment of the present invention, which incorporates the traditional Olympic ring arrangement therein, is designated as 300 in FIG. 9. This Olympic ring embodiment 300 includes a main sheet or base 301 having a periphery or circuitous sidewall 302 that corresponds substantially to the circumference of an Olympic ring arrangement 349. The sheet 301 has an upper surface 303 and a lower surface which define a substantially uniform thickness therebetween. A hole is formed through a projection 305 corresponding to the upper right-hand ring in the Olympic ring arrangement 349. The hole is sized and configured to receive an insert 310 similar to the ones described with reference to the preferred embodiment, L-shaped mouse pad 100. The insert 310 includes an annular sidewall that extends from an upper ring 311 to a bottom wall having an upper surface 313. The upper ring 311 has the same inner diameter as the sidewall and a relatively larger outer diameter. The insert 310 is preferably the same color as the background color of the mouse pad 300, so as to properly highlight the upper right-hand Olympic ring in which it is concentrically nested.

Yet another embodiment of the present invention is designated as 350 in FIGS. 10 and 11. The mouse pad 350 includes a main sheet or base 351 having a periphery or circuitous sidewall 352. The sheet 351 has an upper surface 353 and a lower surface which define a substantially uniform thickness therebetween. The mouse pad 350 further includes a secondary sheet or appendage 381 having a periphery or circuitous sidewall 382. The sheet 381 has an upper surface 383 and a lower surface which define a substantially uniform thickness therebetween. The sheets 351 and 381 are of like thickness, and thus, the upper surfaces 353 and 383 are coplanar when both of the respective lower surfaces lie flat on a desk top or other planar support surface.

In FIG. 12, the appendage 381 is shown apart from the base 351. The configuration of the appendage 381 may perhaps best be described by analogy to human body parts. A head 387 and a trapezoidal torso 395 are integrally joined to one another along a neck line 388. In turn, the trapezoidal torso 395 is integrally joined to a lower body 397 along a waist line 389. The neck line 388 corresponds to the longer parallel side of the trapezoidal torso 395, and the waist line 389 corresponds to the shorter parallel side of the trapezoidal torso 395. A pair of equal length, non-parallel sides 396 extend in divergent manner from the waist line 389 to the neck line 388. The longer parallel side of the trapezoidal torso 395 extends in each direction beyond its integral connection to the head 387 and thereby defines a pair of shoulders 394. The head 387 extends beyond the neck line 388 as approximately two-thirds of a circle.

The lower body 397 includes a pair of legs 398 having outer edges which, relative to the waist line 389, are mirror images of the non-parallel sides 396 of the trapezoidal torso 395. The inner edges of the legs 398 are defined by a common arc 385 which, relative to the waist line 389, is a mirror image of the arc that would complete the partial circle that defines the head 387. Lower edges on the legs 398 extend parallel to the waist line 389 from the inner edges to the outer edges of the legs 398 thereby defining feet 399. Relative to the waist line 389, the feet 399 are mirror images of the shoulders 394.

In FIG. 13, the base 351 is shown apart from the appendage 381. The base 351 is generally rectangular but has an opening or notch 357 formed in one end 358 thereof. The configuration of the notch 357 may perhaps best be described with reference to the human body part analogy used to describe the appendage 381. In particular, the notch 357 is identical in size and configuration to the portion of the appendage 381 disposed above the waist line 389. Thus, the notch 357 includes a pair of straight edges 366 extending inward from the end 358 in divergent manner. Each of the edges 366 meets in a corner with a respective straight edge 364 that extends parallel to the end 358 and toward an opposite edge 366. The edges 364 and 366 cooperate to border an opening sized and configured to receive the torso portion 395 of the appendage 381. Each of the edges 364 meets in an opposite corner with a common arcuate edge 365 extending between junctures with each of the edges 364. The edge 365 borders an opening sized and configured to receive the head portion 387 of the appendage 381.

As shown in FIG. 10, the upper body portion of the appendage 381, including the head 387 and the torso 395, interlocks with the notch 357 in the base 351 to define a first mouse pad configuration having a substantially continuous surface. In this configuration, the non-parallel sides 396 contact the straight edges 366; the shoulders 394 contact the straight edges 364; and the head 387 contacts the arcuate edge 365. The waist line 389 is co-linear with the sidewall 352 along the end 358.

As shown in FIG. 11, the lower body 397 of the appendage 381 interlocks with the notch 357 in the base 351 to define a second mouse pad configuration having a circular hole 359 formed through a portion thereof. In this configuration, the outer edges of the legs 398 contact the straight edges 366; and the feet 399 contact the straight edges 364. The waist line 389 is again co-linear with the sidewall 352 along the end 358. The hole 359 is bordered by the arcuate edges 365 and 385 on the base 351 and the appendage 381, respectively.

The hole 359 has a diameter of approximately three and one-half inches and thus, is sized and configured to receive a coffee mug or an insert like the ones discussed with reference to the preferred embodiment, L-shaped mouse pad 100. Alternatively, a thin sheet of durable material, ideally having a relatively high coefficient of friction, can be secured beneath the sheet 351 to provide a protective barrier between the beverage container and the desktop. The upper body portion of the appendage 381 similarly provides a platform sufficient in size to support such an insert or a coffee mug. For aesthetic purposes, the upper surfaces 353 and 383 of the mouse pad 350 may be decorated with shapes and/or images that relate to or otherwise complement the humanoid shape of the appendage 381.

Another "Olympic ring" embodiment of the present invention is designated as 400 in FIG. 14. This Olympic ring embodiment 400 includes a main sheet or base 401 having a periphery or circuitous sidewall 402 that borders the Olympic ring arrangement 449 and defines a generally trapezoidal shape with rounded corners. The sheet 401 has an upper surface 403 and a lower surface which define a substantially uniform thickness therebetween. A hole is formed through a portion 405 corresponding to the upper right-hand ring in the Olympic ring arrangement 449. The hole is sized and configured to receive an insert 410 similar to the ones described with reference to the preferred embodiment, L-shaped mouse pad 100. The insert 410 includes an annular sidewall that extends from an upper ring 411 to a bottom having an upper surface 413. The upper ring 411 has the same inner diameter as the sidewall and a relatively larger outer diameter, with an upwardly facing wall extending therebetween and sloping downwardly inward. The insert 410 is preferably the same color as the background color of the mouse pad 400, so as to properly highlight the Olympic ring in which it is concentrically nested.

Another embodiment of the present invention is designated as 450 in FIG. 15. The mouse pad 450 includes a main sheet or base 451 having a periphery or circuitous sidewall 452. The sheet 451 has an upper surface 453 and a lower surface which define a substantially uniform thickness therebetween. The sheet 451 is generally rectangular but includes a projection 455 and a notch 457, which have identical shapes and are disposed on opposite sides of the sheet 451, in similar alignment relative to one another. The projection 455 is trapezoidal and is bordered by a pair of equal length, non-parallel edges, which extend away from a side 456 of the sheet 451 in a convergent manner, and an additional edge, which extends between the non-parallel edges and parallel to the side 456. Similarly, the trapezoidal notch 457 is bordered by a pair of equal length, non-parallel edges, which extend in convergent manner into the generally rectangular sheet 451 from a side 458 opposite the side 456. An additional edge extends between the non-parallel edges and parallel to the side 458.

A hole 459 is formed through the sheet 451, including at least a portion of the projection 455, to provide a suitable receptacle for a beverage container or an insert like the ones discussed above with reference to the preferred embodiment, L-shaped mouse pad 100. Since the projection 455 and the notch 457 are identical in size and configuration, a plurality of this type of mouse pad 450 can be arranged in complementary fashion and thus, can be cut from a sheet of mouse pad material in a manner that minimizes waste of such material. Also, the mouse pad 450 is symmetrical about an axis extending perpendicular to the sides 456 and 458 and through the center of the hole 459. Thus, the mouse pad 450 is equally well suited for persons using either hand to operate a mouse on either side of the keyboard.

Figure 16:
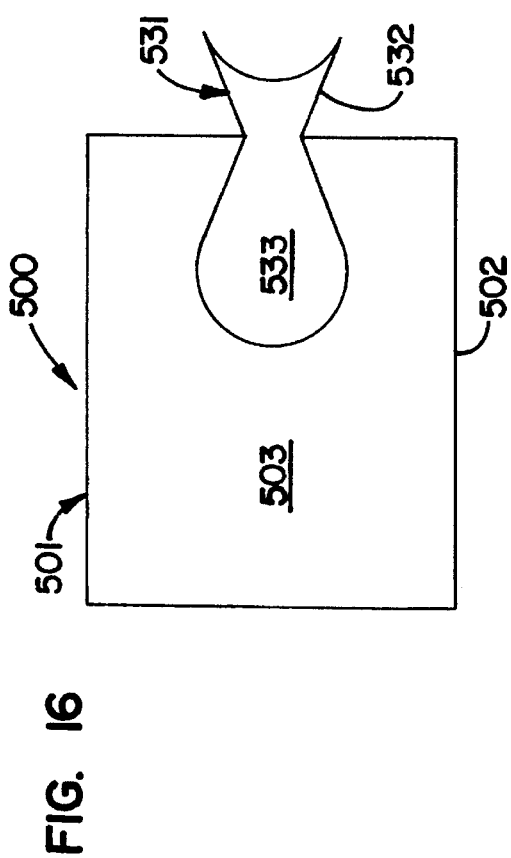
FIG. 16 is a top or plan view of another alternative embodiment mouse pad constructed according to the principles of the present invention, depicted in a first configuration.
Figure 17:
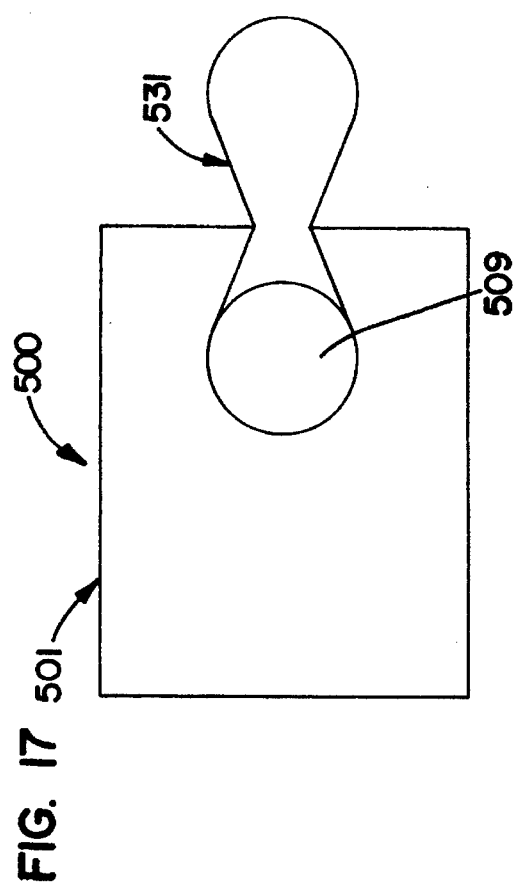
FIG. 17 is a top or plan view of the alternative embodiment mouse pad shown in FIG. 16, depicted in a second configuration.

Yet another embodiment of the present invention is designated as 500 in FIGS. 16 and 17. The mouse pad 500 includes a main sheet or base 501 having a periphery or circuitous sidewall 502. The sheet 501 has an upper surface 503 and a lower surface which define a substantially uniform thickness therebetween. The mouse pad 500 further includes a secondary sheet or appendage 531 having a periphery or circuitous sidewall 532. The sheet 531 has an upper surface 533 and a lower surface which define a substantially uniform thickness therebetween. The sheets 501 and 531 are of like thickness, and thus, the upper surfaces 503 and 533 are coplanar when both of the respective lower surfaces lie flat on a desk top or other planar support surface.

Figure 19:
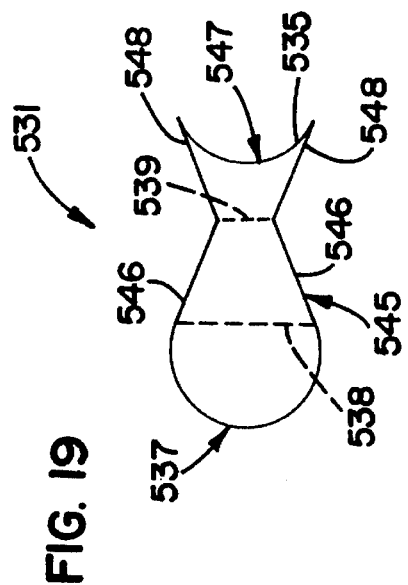
FIG. 19 is a top or plan view of another of the components of the alternative embodiment mouse pad shown in FIGS. 16 and 17.

In FIG. 19, the appendage 531 is shown apart from the base 501. The configuration of the appendage 531 may perhaps best be described by analogy to fish body parts. A head 537 and a trapezoidal torso 545 are integrally joined to one another along a neck line 538. In turn, the trapezoidal torso 545 is integrally joined to a tail 547 along a tail line 539. The neck line 538 corresponds to the longer parallel side of the trapezoidal torso 545, and the tail line 539 corresponds to the shorter parallel side of the trapezoidal torso 545. A pair of equal length, non-parallel sides 546 extend in divergent manner from the tail line 539 to the neck line 538. The head 537 extends beyond the neck line 538 as approximately two-thirds of a circle.

The tail 547 includes a pair of flanges 548 having outer edges which, relative to the tail line 539, are mirror images of the non-parallel sides 546 of the trapezoidal torso 545. The inner edges of the flanges 548 are defined by a common arc 535 which, relative to the tail line 539, is a mirror image of the arc that would complete the partial circle that defines the head 537.

Figure 18:
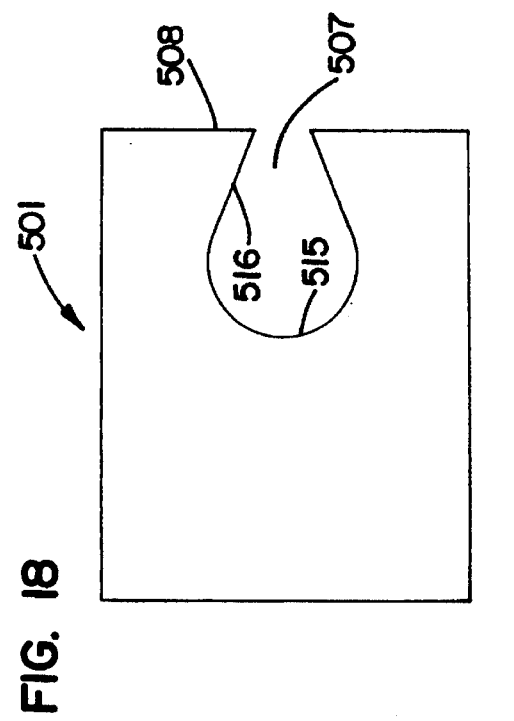
FIG. 18 is a top or plan view of one of the components of the alternative embodiment mouse pad shown in FIGS. 16 and 17.

In FIG. 18, the base 501 is shown apart from the appendage 531. The base 501 is generally rectangular but has a notch 507 formed in one end 508 thereof. The configuration of the notch 507 may perhaps best be described with reference to the fish body part analogy used to describe the appendage 531. In particular, the notch 507 is identical in size and configuration to the portion of the appendage 531 disposed above the tail line 539. Thus, the notch 507 includes a pair of straight edges 516 extending inward from the end 508 in divergent manner. Each of the edges 516 meets in a corner with a common arcuate edge 515 extending between junctures with each of the edges 516.

As shown in FIG. 16, the upper body portion of the appendage 531, including the head 537 and the torso 545, interlocks with the notch 507 in the base 501 to define a first mouse pad configuration having a substantially continuous surface. In this configuration, the non-parallel sides 546 contact the straight edges 516; and the head 537 contacts the arcuate edge 515. The tail line 539 is co-linear with the sidewall 502 along the end 508.

As shown in FIG. 17, the tail 547 of the appendage 531 interlocks with the notch 507 in the base 501 to define a second mouse pad configuration having a circular hole 509 formed through a portion thereof. In this configuration, the outer edges of the tail flanges 548 contact the straight edges 516. The tail line 539 is again co-linear with the sidewall 502 along the end 508. The hole 509 is bordered by the arcuate edges 515 and 535 on the base 501 and the appendage 531, respectively.

The hole 509 has a diameter of approximately three and one-half inches and thus, is sized and configured to receive a coffee mug or an insert like the ones discussed with reference to the preferred embodiment, L-shaped mouse pad 100. Alternatively, a thin sheet of durable material, ideally having a relatively high coefficient of friction, can be secured beneath the sheet 351 to provide a protective layer between the beverage container and the desktop. The upper body portion of the appendage 531 similarly provides a platform sufficient in size to support such an insert or a coffee mug. For aesthetic purposes, the upper surfaces 503 and 533 of the mouse pad 530 may be decorated with shapes and/or images that relate to or otherwise complement the fish shape of the appendage 531.

Additional embodiments of the present invention are shown in FIGS. 20–24. Although distinctly configured, all of these embodiments are functionally similar to the preferred embodiment, L-shaped mouse pad 100 and thus, are described only briefly below. All of these mouse pads have upper and lower surfaces that define a substantially uniform thickness therebetween, and all of these mouse pads have a hole formed through them to receive a coffee mug, a standard beverage can, or an insert like the ones described above with reference to the preferred embodiment, L-shaped mouse pad 100.

As shown in FIG. 20, the mouse pad 550 includes a sheet 551 of mouse pad material cut generally in the shape of a tear drop. A circular hole 559 is formed through the sheet 551 proximate and concentric to a relatively pointed projection 555 bordered by an arc having a radius of curvature less than that of the opposite portion of the pad 550.

As shown in FIG. 21, the mouse pad 600 includes a sheet 601 of mouse pad material that is generally circular in shape. A straight edge 606 extends tangentially from a point on the circular sidewall to an arcuate edge that extends from another point on the circular sidewall. The arcuate edge borders a semi-circular projection 605 on the pad 600. A circular hole 609 is formed through the sheet 601, concentric relative to the arcuate edge about the projection 605.

As shown in FIG. 22, the mouse pad 650 includes a sheet 651 of mouse pad material that is generally circular in shape. A semi-circular projection 655 extends from the sheet 651, and a circular hole 659 is formed through the sheet 651, concentric relative to an arcuate edge about the projection 655. The relative lack of corners on each of the embodiments 550, 600, and 650 allow greater freedom in orienting the mouse pad relative to the keyboard, and the beverage holder relative to the work surface on the mouse pad.

As shown in FIG. 23, the mouse pad 700 includes a sheet 701 of mouse pad material that is generally triangular in shape with rounded corners. A circular hole 709 is formed through the sheet 701 proximate one of the vertices 705 of the triangular sheet 701 and concentric to the rounded edge about that vertex.

As shown in FIG. 24, the mouse pad 750 includes a sheet 751 of mouse pad material that is generally cut in the shape of a partial ring bordered by a pair of concentrically arranged arcuate edges 761 and 762 and a pair of radially oriented, straight edges 763 and 764, which converge toward a point about which the arcuate edges 761 and 762 are centered. A semi-circular projection 755 extends beyond the arcuate edge 761, which has the greater radius of curvature, and the straight edge 764 extends tangentially into the arcuate edge about the projection 755. A circular cork pad 759 is secured to the sheet 751, including a portion of the projection 755, to provide a high friction, water absorbent surface for supporting the beverage container.

Figure 26:
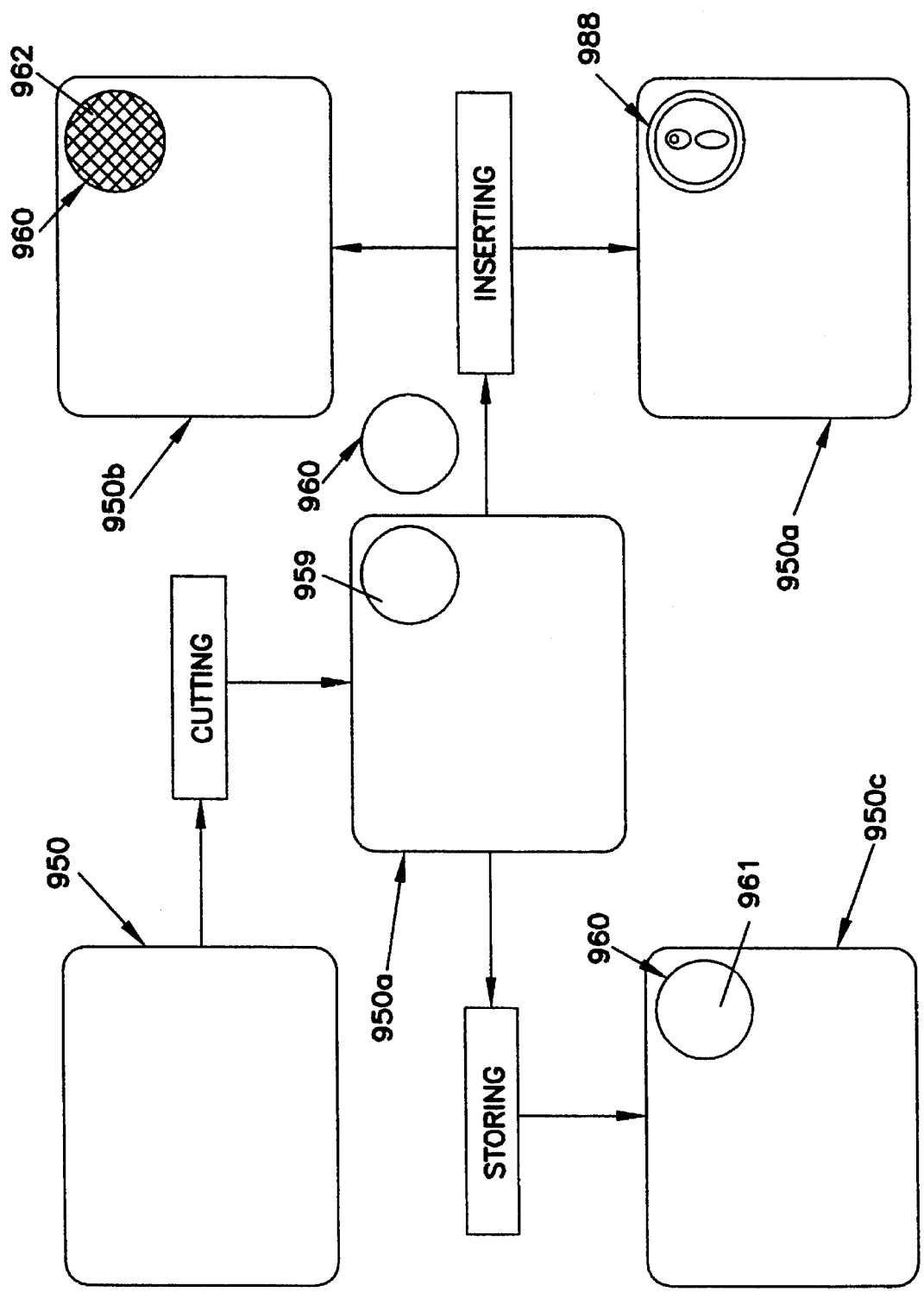
FIG. 26 is a flow chart for methods of making a mouse pads with beverage holders according to the principles of the present invention.

The present invention may also be seen to provide methods of making mouse pads with beverage holders and/or methods of storing a beverage container proximate a mouse pad. Several such methods may be described with reference to the flow chart shown in FIG. 26. In each of the described methods, a circular hole 959 is cut through a mouse pad 950. The hole 959 is sufficient in size to encompass the cross-section of a beverage container 988. According to one method, the excised mouse pad material is discarded, and the beverage container 988 is simply inserted into the hole 959 through the mouse pad 950a. According to another method, the circular hole 959 is preferably cut in such a manner that a circular piece 960, similar in size and shape to the circular hole 959, is removed from the mouse pad 950 and retained. The circular piece 960 may then be selectively inverted and inserted into the circular hole 959 to arrive at the mouse pad 950b, which provides a relatively high friction, rubberized surface 962 on which a beverage container may be stored. Additionally, when the beverage retaining aspect of the present invention is not being used, the circular piece 960 may be inserted into the hole 959, right side 961 up, to arrive at the mouse pad 950c, which provides a substantially continuous mouse pad work surface. Alternatively, the circular hole may be cut to accommodate an insert such as that designated as 910 in FIG. 25, in which case the cut out portion need not be saved because the insert functions as coaster and a plug for the hole when inserted upside down into the hole.

Another mouse pad appendage constructed according to the principles of the present invention is designated as 870 in FIG. 27. The appendage 870 includes a block 871 of mouse pad material having a periphery or circuitous sidewall 872. The block 871 has an upper surface 874 and a lower surface which define a substantially uniform thickness therebetween, approximately equal to the thickness of a conventional mouse pad to which the appendage 870 is to be appended. The block 871 may be described as head shaped, which in this exemplary embodiment is intended to resemble the head of the Frankenstein monster. This particular likeness was selected as an example because only very limited artistic ability is needed to convey the image. Those skilled in the art will recognize that similar appendages could be designed with other head shapes.

The configuration of the block 871 includes shading 881 representative of Frankenstein like hair across an upper end portion 873 of the block 871, and protrusions 882 representative of bolts extending from opposite sides of a lower end portion of the block 871 opposite the upper end portion 873. A circular hole 879 is formed through the block 871 to receive and retain a beverage container and/or an insert such as the ones described with reference to the preferred embodiment 100. In addition to the advantages discussed above with the appendage 200, another feature of this embodiment 870 is that an insert bearing a portrait photograph may be inserted into the hole 879 to make a personal statement about one's tastes or personality, for example.

A flap 890 is connected to the lower surface of the block 871 and extends outward beyond the lower end portion thereof. The flap 890 is made of a thin sheet of durable material, such as vinyl. The flap 890 is designed to lie beneath a mouse pad and maintain the lower end portion of the appendage 870 in abutment with a substantially straight edge on the mouse pad. An upper surface 894 on the flap 890 lies directly beneath and in contact with a lower surface on the mouse pad, and a lower surface on the flap 890 lies directly above and on the same support surface on which the mouse pad lies. A plurality of projections 899 are disposed on the upper surface 894 to more positively interconnect the appendage 870 to the mouse pad. The projections 899 project upward and toward the block 871 and terminate in points designed to engage the lower surface on the mouse pad and thereby resist movement of the appendage 870 away from the mouse pad.

A desktop organizer constructed according to the principles of the present invention is designated as 800 in FIGS. 28 and 29. A preferred embodiment of the organizer 800 is made of injection molded plastic, but those skilled in the art will recognize that other materials and/or methods of manufacture are also available. In a preferred configuration, the organizer 800 includes a base 810 designed to rest upon a desktop or other substantially flat, support surface. The base 810 is substantially rectangular in shape and has a beveled sidewall 811 disposed about its perimeter. The sidewall 811 extends from a downwardly facing surface 818 on the base 810, which engages the support surface, to an upwardly facing surface 812 on the base 810. The perimeter of the upwardly facing surface 812 lies within the perimeter of the downwardly facing surface 818.

A first cavity or depression 813 is formed in the base 810 and is sized and configured to accommodate a mouse pad 819 in the shape of a rectangle having rounded corners. The mouse pad 819 is a substantially planar sheet of foam material having an upper surface and a lower surface that define a substantially uniform thickness therebetween. The thickness of the mouse pad 819 is at least as great as the depth of the depression 813 as measured from the upwardly facing surface 812. As a result, the edges of the depression 813 do not interfere with operation of a mouse 80, and debris on the upwardly facing surface 812 is less likely to reach the upper surface of the mouse pad 819.

A second cavity or depression 814 is formed in the base 810 and is sized and configured to accommodate a beverage container, such as a standard size coffee mug or pop can. In a preferred configuration, the second depression 814 is formed as a circle having a diameter of approximately three and one-half inches. The cylindrical sidewall 815 of the second depression 814 is capable of retaining a quantity of liquid and also discourages tipping of a beverage container disposed within the second depression 814.

A third cavity or depression 816 is formed in the base 810 and is sized and configured to accommodate supplies and/or accessories. In this preferred configuration, the third depression 816 is rectangular in shape and sufficient in size to accommodate a service kit 808. Such a kit 808 includes a housing or shell in which or beneath which are stored items such as a relatively small screw driver, some cotton swabs, a container of alcohol or other solvent, and perhaps some aspirin or other medication.

The mouse 80 is connected to a computer by means of a cord 81. An intermediate portion of the cord 81 is secured relative to a clip 820 extending upward from the upwardly facing surface 812, thereby defining a working cord portion 82 between the clip 820 and the mouse 80. The clip 820 has a substantially trapezoidal cross-section and includes a pair of non-parallel walls 821 and 822 that extend in converging manner upward from the upwardly facing surface 812 to a top wall 823. An arcuate notch 828 is formed in the top wall 823 and between the walls 821 and 822, and a diameter of the notch 828 extends parallel to the upwardly facing surface 812 and lies beneath the top wall 823. The diameter of the cord 81 is approximately equal to that of the notch 828, and the cord 81 is retained within the notch 828 by friction and/or resilience. The clip 820 functions to isolate the mouse 80 and the working cord portion 82 from the remainder of the cord 81 and thus, reduces the drag on the mouse 80 during operation thereof and the likelihood of the mouse cord 81 disturbing or snagging on other objects proximate the organizer 800.

Figure 30:
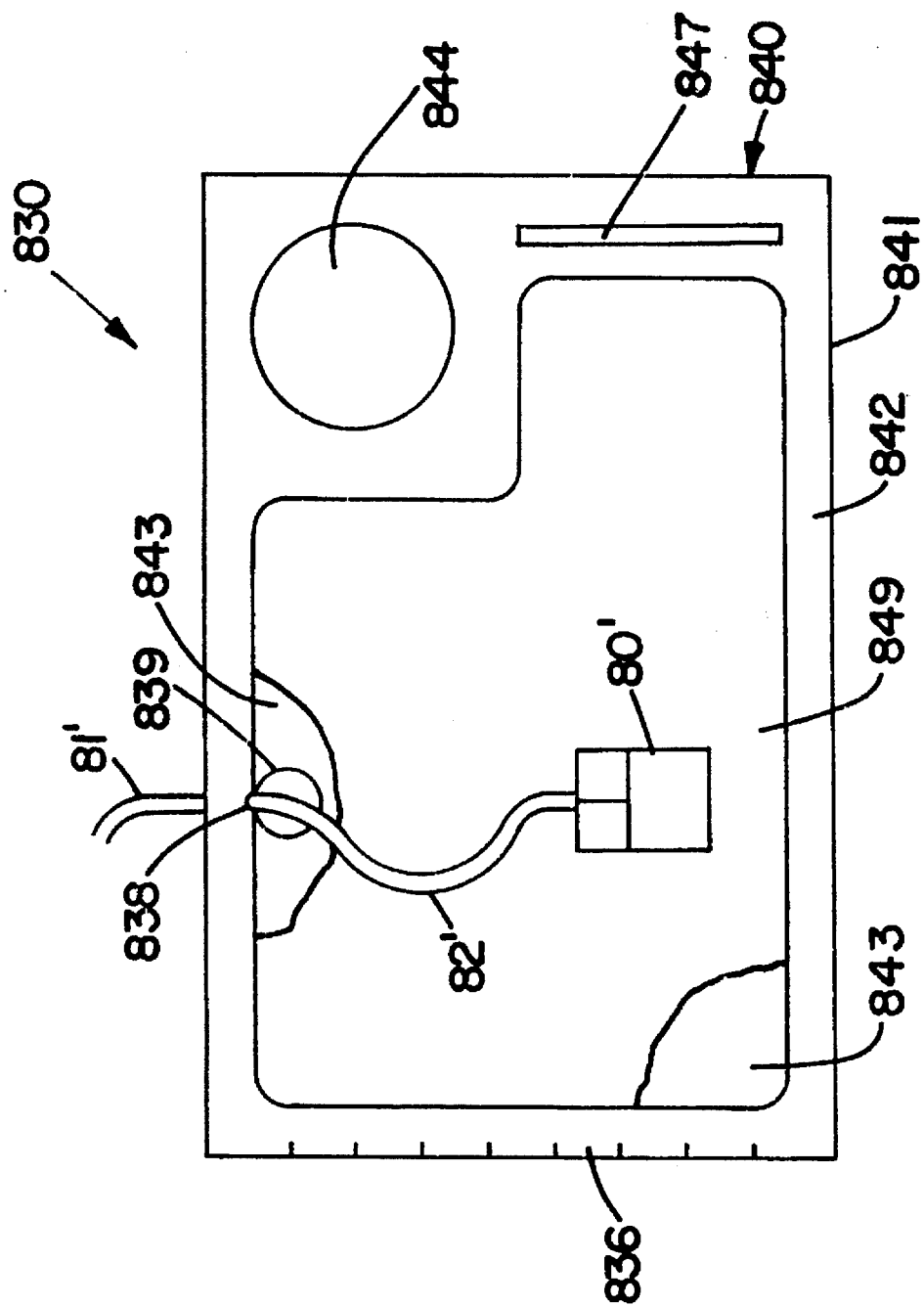
FIG. 30 is a top of plan view of another desktop organizer constructed according to the principles of the present invention.

Another desktop organizer or mouse pad holder constructed according to the principles of the present invention is designated as 830 in FIG. 30. The mouse pad holder 830 is similar in certain respects to the one shown in FIGS. 28 and 29, but is designed to be more space conservative. The mouse pad holder 830 includes a base 840 designed to rest upon a desktop or other substantially flat, support surface. The base 840 is substantially rectangular in shape and has a sidewall 841 disposed about its perimeter. The sidewall 841 extends perpendicularly from a downwardly facing surface on the base 840, which engages the support surface, to an upwardly facing surface 842 on the base 840. The perimeter of the upwardly facing surface 842 lies directly above the perimeter of the downwardly facing surface.

A first cavity or depression 843 is formed in the base 840 and is sized and configured to accommodate a mouse pad 849 that is substantially L-shaped and has rounded corners. The mouse pad 849 is a substantially planar sheet of foam material having an upper surface and a lower surface that define a substantially uniform thickness therebetween. The thickness of the mouse pad 849 is at least as great as the depth of the depression 843 as measured from the upwardly facing surface 842. As a result, the edges of the depression 843 do not interfere with operation of a mouse 80', and debris on the upwardly facing surface 842 is less likely to reach the upper surface of the mouse pad 849.

A second cavity or depression 844 is formed in the base 840 and is sized and configured to accommodate a beverage container, such as a standard size coffee mug or pop can. In a preferred configuration, the second depression 844 is formed as a circle having a diameter of approximately three and one-half inches. The cylindrical sidewall of the second depression 844 is capable of retaining a quantity of liquid and also discourages tipping of a beverage container disposed within the second depression 844.

A third cavity or depression 847 is formed in the base 840 and is sized and configured to accommodate an elongate member, such as a pen or a pencil. Those skilled in the art will recognize that the third depression 847 could be eliminated to further conserve space. A scale 836 is disposed along one side of the base 840 to provide a convenient means for measuring and/or comparing the relative sizes of items.

The mouse 80' is connected to a computer by means of a cord 81'. An intermediate portion of the cord 81' is secured relative to the base 840 to define a working cord portion 82' between the base 840 and the mouse 80'. In particular, a hole 839 is formed through the base 840 just inside the perimeter of the first depression 843. The hole 839 is sufficient in size to allow passage of a plug at the end of the mouse cord 81'. A channel or groove extends from the hole 839 to an opening in the sidewall 841. The groove has a cross-section approximately equal to that of the mouse cord 81'. The groove extends beneath the upwardly facing surface 842 and substantially perpendicular to the sidewall 841. A slot 838 is formed through the base 840 just outside the perimeter of the first depression 843. The slot 838 extends from the upwardly facing surface 842 to the groove extending beneath the upwardly facing surface 842, and the slot 838 is in communication with the hole 839, as well.

The mouse cord 81' is secured to the base 840 by first removing the mouse pad 849 from the first depression 843, and then inserting the mouse cord plug through the hole 839. The plug is plugged into the computer, and the mouse cord 81' is pulled through the hole 839 until a desired length of effective or working mouse cord 82' remains. The mouse cord 81' is urged into the slot 838 and the groove, and the mouse pad 849 is returned to the first depression 843. In this manner, the working mouse cord 82' is effectively isolated from the remainder of the mouse cord 81'.

Another mouse cord retainer constructed according to the principles of the present invention is designated as 850 in FIG. 31. The retainer or clip 850 is similar to the one discussed above with reference to the organizer 800 but designed to be secured directly to a mouse pad. The clip 850 is made of injected molded plastic and may be said to be generally U-shaped. The general U-shape of the clip 850 is defined by a first horizontal wall 861, a second horizontal wall 863, and an interconnecting vertical wall 862. The horizontal walls 861 and 863 cooperate to define a gap 864 therebetween. The gap 864 is relatively wider proximate the vertical wall 862 and relatively narrower proximate the opposite, distal ends of the horizontal walls 861 and 863. The clip 850 is designed to be attached to a mouse pad having a thickness approximately equal to the gap 864 near the vertical wall 862.

In attaching the clip 850 to such a mouse pad, the distal ends of the horizontal walls 861 and 863 are forced apart from one another to receive an edge of the mouse pad. The edge of the mouse pad is moved toward the vertical wall 862, and the resilience of the clip 850 biases the horizontal walls 861 and 863 toward one another, thereby pinching the mouse pad therebetween. An advantage of this embodiment is that the clip 850 can be positioned anywhere about the perimeter of the mouse pad.

A retaining means is disposed on the first horizontal wall 861 proximate an end thereof, opposite the vertical wall 862, and extending away from the second horizontal wall 863. The retaining means has a substantially trapezoidal cross-section that includes a pair of non-parallel, arcuate walls 851 and 852 that extend in converging manner upward from the first horizontal wall 861 to a top wall 853. An arcuate notch 858 is formed in the top wall 853 and between the arcuate walls 851 and 852. A diameter of the notch 858 extends parallel to the first horizontal wall 861 and lies beneath the top wall 853. The diameter of a mouse cord is approximately equal to that of the notch 858, and an intermediate portion of the mouse cord is retained within the notch 858 by friction and/or resilience to define or isolate a working cord portion between the clip 850 and the mouse.

Another mouse pad arrangement constructed according to the principles of the present invention is designated as 900 in FIG. 32. The arrangement 900 includes a substantially planar sheet of mouse pad material 901 having an upper surface 903 and a lower surface that define a substantially uniform thickness therebetween. A sidewall 902 extends about the perimeter of the sheet of material 901 and defines a rectangle having rounded corners. A clip 850 is selectively secured to an edge of the sheet of material 901 in the manner described above with reference to FIG. 31.

A coaster 910 is secured by adhesive to the upper or work surface 903 of the sheet of material 901 at an eccentric location, namely, the upper right-hand corner. The coaster 910 is circular in shape and has a cylindrical sidewall or rim 911 that extends upward from a bottom wall 913. The inner diameter of the rim 911 is approximately three and one-half inches. When a beverage container, such as a standard size coffee mug or pop can, is positioned on the bottom wall 913, the rim 911 extends higher above the work surface 903 than does a lowermost portion of the container's sidewall. As a result, the rim 911 tends to prevent tipping of the beverage container and retain liquid within the confines of the coaster 910.

Figure 33:
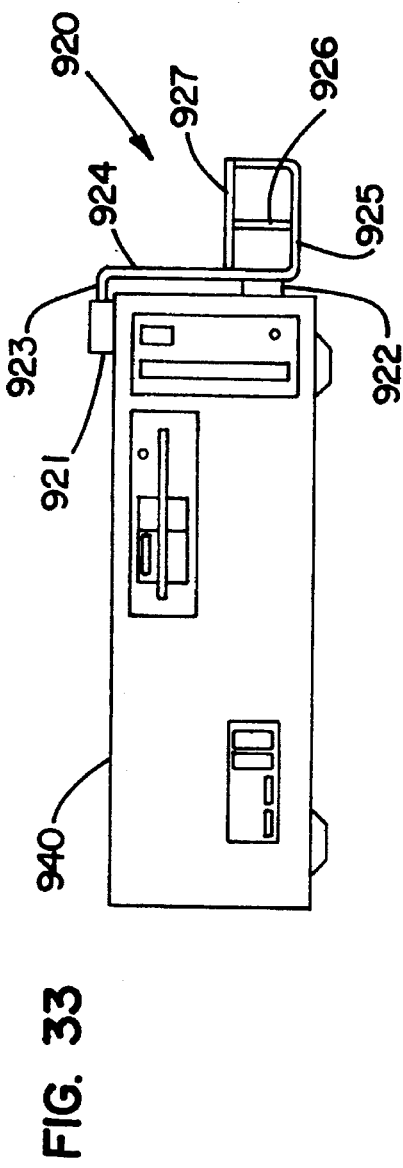
FIG. 33 is a front view of a beverage container holder constructed according to the principles of the present invention, and supported by a computer housing.
Figure 34:
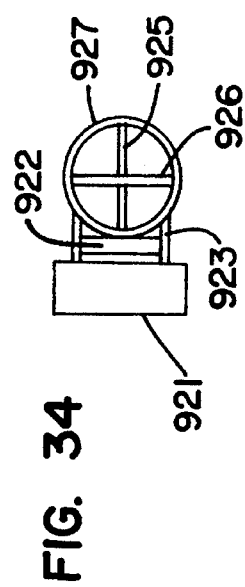
FIG. 34 is a top view of the beverage container holder shown in FIG. 33.

Another beverage holder constructed according to the principles of the present invention is designated as 920 in FIGS. 33 and 34. The beverage holder 920 is designed to secure a beverage container relative to a computer housing 940 for reasons similar to those stated above with respect to the mouse pad beverage holders. The holder 920 includes a first rubber block 921 that engages a top wall of the computer housing 940, and a second rubber block 922 that engages a side wall of the computer housing 940. A pair of generally L-shaped, metal wires 923 extend horizontally out from the first rubber block 921 and then vertically down to a basket. The metal wires 923 may be interconnected by a wire segment extending therebetween within the rubber block 921.

The basket includes a pair of generally U-shaped wires 925 and 926, having bases that extend perpendicular relative to one another and having upwardly extending distal ends, and an annular wire 927 that is connected to each of the upwardly extending distal ends. The basket is sized and configured to receive and retain a beverage container having a diameter of approximately three and one-quarter inches. All of the wires of the holder 920 are integrally joined to one another by welding or by virtue of being portions of the same piece of wire.

The second rubber block 922 is secured to the downwardly extending portions 924 of the wires 923 and outside the confines of the basket. The weight of the holder 920, as well as any beverage container stored therein, cooperates with the high friction blocks 921 and 922 to secure the holder 920 relative to the computer housing 940. Those skilled in the art will recognize that the holder 920 will likewise work relative to other structures having a top wall and an adjacent sidewall extending perpendicular relative to the top wall. Those skilled in the art will also recognize that the holder 920 may be made from other materials and into different configurations. For example, a functionally similar holder could be made from injection molded plastic and could have a continuous basket portion that served the additional function of retaining liquid therein.

Figure 35:
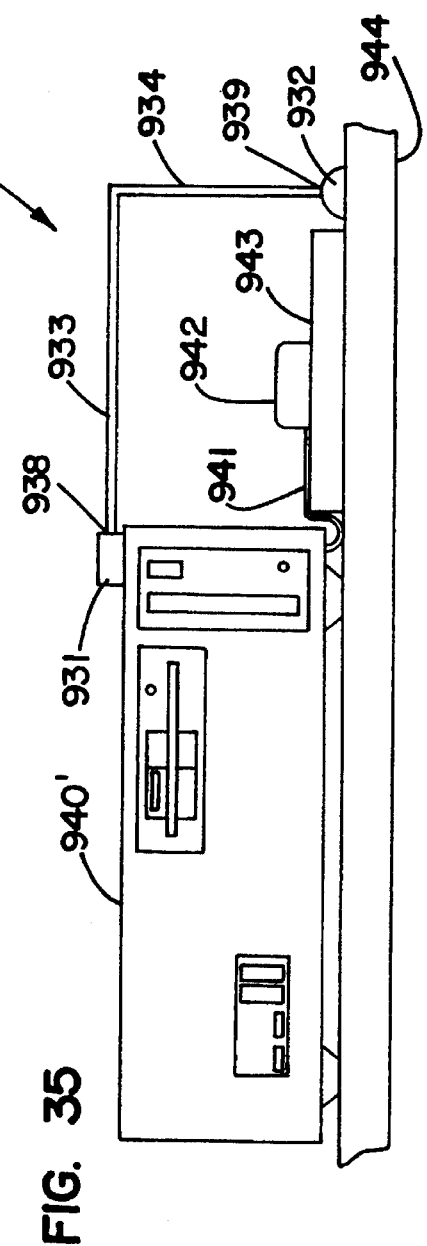
FIG. 35 is a front view of another beverage container holder constructed according to the principles of the present invention, and supported by a computer housing.

Yet another beverage holder constructed according to the principles of the present invention is designated as 930 in FIG. 35. The holder 930 includes a first pair of rubber blocks 931 that engage a top wall of a computer housing 940', and a second pair of rubber blocks 932 that engage a desktop 944 on which the computer housing 940' is supported. A first substantially flat metal sheet 933 extends horizontally from the rubber blocks 931 to a second substantially flat metal sheet 934, which in turn, extends vertically from the first sheet 933 to the rubber blocks 932. Distal fingers 938 on the first sheet 933 extend into engagement with the rubber blocks 931, and distal fingers 939 on the second sheet 934 extend into engagement with the rubber blocks 932.

The first sheet 933 and the second sheet 934 cooperate to define a substantially L-shaped member that cooperates with the computer housing 940' and the desktop 944 to enclose the mouse pad 943 on four sides. The weight of the holder 930, as well as any objects stored thereon, cooperates with the high friction blocks 931 and 932 to secure the holder 930 relative to the computer housing 940'. The first sheet 933 provides a surface above the mouse pad 943 on which a beverage container and/or other items may be used or stored, yet the L-shaped member does not significantly interfere with operation of the mouse 942 that is connected by cord 941 to the computer.

Although the present invention is described herein with reference to particular applications and specific embodiments, those skilled in the art will recognize additional embodiments and applications that nonetheless fall within the scope of the present invention. For example, the present invention may be implemented on additional mouse pad configurations and with materials and arrangements other than those disclosed herein. As another example, structure functionally similar to that described with reference to FIGS. 10–13 and 16–19 could be incorporated into a table top pad for children's activities. Such pads, having notches with complementary appendages, may prove educational and/or entertaining, and a whole series of appendages and complementary notches could be provided in other recognizable forms and interconnected to define a variety of holes having common geometrical shapes in addition to circles. As yet another example, the beverage holder described with reference to FIGS. 33 and 34 could be used to secure a beverage container relative to a typical metal filing cabinet. Accordingly, the present invention is to be limited only by the claims that follow.

We claim:

1. A mouse pad, comprising a generally rectangular sheet of mouse pad material having associated therewith a retaining means for retaining a beverage container, wherein said generally rectangular sheet also has a notch formed therein and a projection extending therefrom, and said projection has at least one dimension greater than three and one-half inches, and said notch is substantially similar in size and configuration to said projection.

2. The mouse pad of claim 1, wherein said retaining means includes a circular hole formed through said sheet, including at least a portion of said projection, and said circular hole is approximately three and one-half inches in diameter.

3. The mouse pad of claim 1, wherein said notch is generally in the shape of a circle having a diameter of approximately three and one-half inches.

4. A mouse pad, comprising a first piece of mouse pad material sized and configured to accommodate operation of a computer mouse, a second piece of mouse pad material sized and configured to support a beverage container, and a connecting means for connecting said second piece of mouse pad material to said first piece of mouse pad material, wherein said second piece of mouse pad material has a straight edge, and said connecting means includes a flap secured beneath said second piece of mouse pad material and extending beyond said straight edge to lie beneath said first piece of mouse pad material when said straight edge abuts a straight edge on said first piece of mouse pad material.

5. A mouse pad having associated therewith a retaining means for retaining a beverage container and further comprising:

a first piece of mouse pad material having an opening formed therein, said opening being bordered by an arcuate edge that extends through more than 180 degrees and has a radius of approximately one and three-quarters inches; and a second piece of mouse pad material having a projection substantially similar in size and shape to said opening, wherein said projection is selectively inserted into said opening to provide a substantially continuous upper surface on the mouse pad.

6. The mouse pad of claim 5, wherein said opening is a notch that extends inward from an edge of said first piece, and said second piece has an additional portion adjacent said projection, and said additional portion is a partial mirror image of said projection, and said additional portion is selectively inserted into said notch to cooperate with said arcuate edge in bordering a circular hole in the mouse pad, said hole having a diameter of approximately three and one-half inches.

7. The mouse pad of claim 6, wherein said notch is less than three and one-half inches across at said edge of said first piece.

8. A mouse pad, comprising a sheet of mouse pad material having an upper surface, and a beverage container support secured to said sheet of mouse pad material at an eccentric location, wherein said support is generally circular in shape and presents an upwardly facing surface which has a higher coefficient of friction and is more absorbent than said upper surface.

9. A mouse pad of a type that rests freely upon a support surface and supports a beverage container having a sidewall, comprising:

a sheet of mouse pad material having a working surface on which a mouse may be operated; and a beverage container retaining means adjoined directly to said sheet, for retaining the beverage container relative to said sheet, wherein a portion of said retaining means is disposed higher above the support surface than is a portion of the sidewall on the beverage container when retained by said retaining means, whereby said portion of said retaining means provides resistance to tipping of the beverage container.

10. The mouse pad of claim 9, wherein said beverage container retaining means includes:

a block of mouse pad material having a perimeter;

a beverage container support associated with said block, located within said perimeter, and having a dimension of at least three and one-quarter inches; and a connecting means for releasably connecting said block adjacent to said sheet of mouse pad material.

11. The mouse pad of claim 9, wherein said beverage container retaining means includes a hole formed through said sheet and sufficient in size to receive a cylindrical beverage container as large as three and one-quarter inches in diameter.

12. The mouse pad of claim 9, wherein said beverage container retaining means includes a coaster secured to an eccentric portion of said working surface.

13. The apparatus of claim 9, wherein said sheet of mouse pad material is flexible.

14. An apparatus designed to facilitate operation of a computer mouse and intermittent storage of a beverage container, comprising:

a mouse pad having a perimeter and designed to rest upon a support surface; and a beverage container retaining means secured within the perimeter of said mouse pad, for retaining the beverage container relative to said mouse pad.

15. The apparatus of claim 14, wherein said retaining means includes a circular hole formed through said mouse pad.

16. The apparatus of claim 15, wherein said circular hole is approximately three and one-half inches in diameter.

17. The apparatus of claim 16, wherein said beverage container retaining means further includes a plastic insert having a cylindrical sidewall and a circular bottom, and said cylindrical sidewall has an outer diameter of approximately three and one-half inches and an inner diameter of approximately three and one-quarter inches, and said insert is secured within said circular hole.

18. The apparatus of claim 17, wherein said insert is approximately as deep as said mouse pad is thick, whereby said insert can be inserted upside down into said circular hole to effectively fill said circular hole and contribute to a substantially continuous upper surface on said mouse pad.

19. The apparatus of claim 14, wherein said beverage container retaining means includes a disc which is made of cork and secured to an upper surface of said mouse pad.

20. The apparatus of claim 14, wherein said beverage container retaining means includes an upwardly opening containment space in said mouse pad.

21. The apparatus of claim 14, wherein said mouse pad includes an upper surface having a first, relatively lower coefficient of friction, and said beverage container retaining means includes an upwardly facing surface having a second, relatively higher coefficient of friction.

22. The apparatus of claim 14, wherein said beverage container retaining means has an effective diameter of approximately three and one-quarter inches.

23. The apparatus of claim 14, wherein said mouse pad occupies an area of less than one square foot.

24. The apparatus of claim 14, wherein said mouse pad includes an upper surface having a first, relatively lower coefficient of friction and a lower surface having a second, relatively higher coefficient of friction, and said beverage container retaining means includes an upwardly facing surface having said second coefficient of friction and a downwardly facing surface having said first coefficient of friction.

25. The apparatus of claim 14, wherein said mouse pad is made of a foam material.

* * * * *